(12) United States Patent
Nyman

(10) Patent No.: US 9,202,069 B2
(45) Date of Patent: Dec. 1, 2015

(54) ROLE BASED SEARCH

(71) Applicant: Cloudfinder Sweden AB, Taby (SE)

(72) Inventor: Marcus Nyman, Lund (SE)

(73) Assignee: Cloudfinder Sweden AB, Taby (SE)

(*) Notice: Subject to any disclaimer, the term of this patent is extended or adjusted under 35 U.S.C. 154(b) by 5 days.

(21) Appl. No.: 14/087,564

(22) Filed: Nov. 22, 2013

(65) Prior Publication Data

US 2014/0380407 A1    Dec. 25, 2014

Related U.S. Application Data

(60) Provisional application No. 61/837,309, filed on Jun. 20, 2013.

(51) Int. Cl.
  *H04L 29/06* (2006.01)
  *G06F 21/60* (2013.01)
(52) U.S. Cl.
  CPC .................................. *G06F 21/604* (2013.01)
(58) Field of Classification Search
  CPC ....................................................... G06F 21/604
  USPC ............................................................. 726/1
  See application file for complete search history.

(56) References Cited

U.S. PATENT DOCUMENTS

| | | | |
|---|---|---|---|
| 6,513,039 B1* | 1/2003 | Kraenzel | 707/784 |
| 7,685,123 B1* | 3/2010 | Thompson et al. | 707/783 |
| 7,890,527 B1 | 2/2011 | Nene et al. | |
| 2003/0149893 A1* | 8/2003 | Chang et al. | 713/201 |
| 2003/0229705 A1 | 12/2003 | Yohichiroh | |
| 2007/0043705 A1 | 2/2007 | Kaushik et al. | |
| 2008/0034017 A1 | 2/2008 | Giampaolo et al. | |
| 2008/0307017 A1 | 12/2008 | Lyons et al. | |
| 2009/0320088 A1* | 12/2009 | Gill et al. | 726/1 |
| 2010/0318782 A1 | 12/2010 | Auradkar et al. | |
| 2011/0145199 A1 | 6/2011 | Prasad Palagummi | |
| 2011/0219425 A1* | 9/2011 | Xiong et al. | 726/1 |
| 2011/0247046 A1* | 10/2011 | Gross et al. | 726/1 |
| 2011/0277017 A1* | 11/2011 | Ivanov et al. | 726/4 |
| 2012/0030196 A1 | 2/2012 | Karaoguz et al. | |
| 2012/0185435 A1 | 7/2012 | Misra et al. | |
| 2012/0310931 A1 | 12/2012 | Oliver et al. | |
| 2014/0096215 A1* | 4/2014 | Hessler | 726/7 |

* cited by examiner

*Primary Examiner* — Michael S McNally
(74) *Attorney, Agent, or Firm* — Snyder, Clark, Lesch & Chung, LLP

(57) ABSTRACT

The disclosure relates to accessing information, and more specifically to accessing information wherein the information is protected by access rules. In particular, the invention relates to a search system comprising integrated access request routines. The disclosure also relates to a search system and to a corresponding computer program.

13 Claims, 4 Drawing Sheets

ROLE BASED SEARCH

CROSS-REFERENCE TO RELATED APPLICATION

This application claims priority under 35 U.S.C. §119 based on U.S. Provisional Patent Application No. 61/837,309, filed Jun. 20, 2013, the disclosure of which is hereby incorporated by reference herein.

TECHNICAL FIELD

The disclosure relates to accessing information, and more specifically to accessing information wherein the information is protected by access rules. In particular, the invention relates to a method in a search system comprising integrated access request routines. The disclosure also relates to a search system and to a corresponding computer program.

BACKGROUND

The collected information of a company is generally electronically stored in one or several data storages. The information objects e.g., documents are often assigned different access levels. Companies often also hold some kind of backup storage, which may only be accessed by authorised personnel, e.g., the IT department.

When a user requests access to an object, to which the user is not authorized access, only a general denial is delivered. In order to get access to the object, a manual request to an IT department is then required. The act of giving access may then include involving someone authorized to determine whether access should be given.

With today's technique generally only IT staff can access and give access to secured information. Accessing information from e.g., backups today will mean manually asking for access from e.g., a manager, and then doing several searches and restoring operations.

SUMMARY OF THE INVENTION

The invention relates to a role-based automated way of accessing information in a data storage, such as a backup. This disclosure provides a method of granting access to objects in a data storage comprising objects associated with different access rules. The method comprises receiving a request to access one or several objects from a requester, retrieving access rules of the requested object or objects and analyzing the access rules to determine if requester is permitted to access the requested object or objects. If the requester is not permitted to read at least one of the requested objects, then the method comprises sending permission request(s) to the authorizer(s), receiving permission response(s) from authorizer(s). The method further comprises granting access to requested objects based on rules and the received permissions.

The invention allows all or selected users to perform Information requests and searches in a data storage comprising data with restricted access. Because a data storage controller will present relevant data to an Information Administrator (authorizer) user who will decide which information that can be shared, no involvement from IT Staff/backup system operators is needed.

The authorization request may be designed to be user friendly and the authorizer should easily be able to grant access.

According to one aspect, the method further comprises presenting the object or objects to which permission is granted to the requester. According to one aspect, the method further comprises presenting at least one link to the objects. Thereby, the requester may easily take part of the results.

According to one aspect, the data storage is a cloud database. In a cloud database, storage is unlimited.

According to one aspect, the step of presenting the objects comprises successively presenting objects the requester when access is granted. In this way, results are provided as soon as possible to the requester, without interaction from administrators or IT Helpdesk.

According to one aspect, the method further comprises retrieving the object or objects, to which access is granted from respective database.

According to one aspect, the access rules are dynamic According to one aspect, the access rules correspond to different roles or users. According to one aspect, one object may be associated with several rules. The possibility to add and amend rules provides a flexible way of quickly protecting sensible content by additional rules. Furthermore, because the system does not require manual assistance, access rules may be used in a new flexible way. This in turn implies that more freedom is provided in terms of giving in principle all users access to databases such as back up archives, because the sensitive material may still be protected by access rules.

According to one aspect, the invention relates to a computer program, comprising computer readable code which, when run on a controller, causes the controller to perform the method as described above.

According to one aspect, a searching system for granting access to objects, the searching system comprises a data storage comprising objects associated with different access rules, a rules and authorizer data storage data storage controller. The data storage controller is configured to receive a request to access one or several objects in the database from a requester; retrieve access rules of the requested object or objects; analyze the access rules to determine if requester is permitted to access the requested object or objects and if the request is not permitted to read at least one of the requested object, then: sending a permission request(s) to an authorizer(s); receiving permission response(s) from the authorizer(s) and grant permission to the requested objects based on the access rules of the requested object and the received permissions.

With the above description in mind, an object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The invention is based on the idea to facilitate the handling of permissions and authorizations by providing a search system comprising integrated access request routines. The idea is to avoid manual handling of permissions and authorization and also be able to add and change the access rules dynamically, without causing too much trouble for the users. Hence, the invention relates to a method or process for automatically authorizing access to objects or entries in a data storage, wherein the objects are assigned different access rules. The rules may correspond to roles or users.

Figure 1:
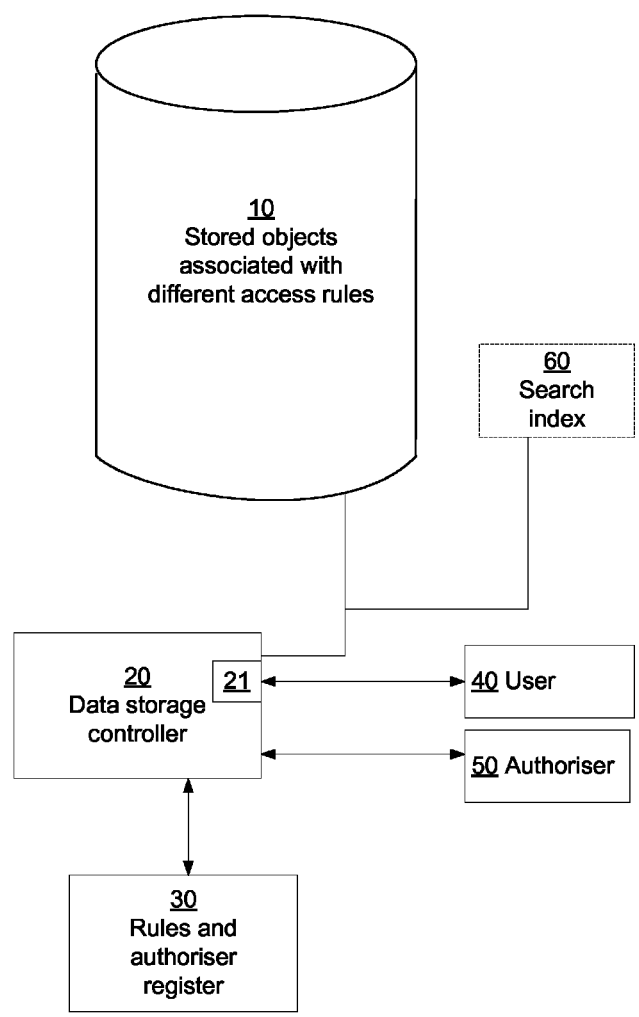
FIG. 1 illustrates an environment where the invention can be implemented.

FIG. 1 illustrates an environment where the method of granting access to objects in a data storage comprising objects associated with different access rules can be implemented. FIG. 1 discloses a data storage 10, a data storage controller 20, a rules and authorizer(s) register 30, a user 40 and an authorizer 50.

The data storage 10 is typically a back-up archive comprising a copy of all information belonging to a user. A back-up archive is created by at frequent intervals collecting all data associated with a user and storing it in the data storage 10. According to one aspect, the data storage is configured to store standard objects. According to one aspect the archive 10 is a back-up. Standard objects are e.g.: Email, Document, Calendar Event, Contact, Web page, Database Record, etc. As an example for salesforce Standard Salesforce objects are Accounts, Contacts, Leads, Opportunities, etc.

According to one aspect, the data storage is a cloud database management system. A cloud database management system (CDBMS) is a distributed database that delivers computing as a service instead of a product.

The objects stored in the data storage are associated with different access rules. There are several ways of specifying access rules. E.g., the creator of an object is typically authorised to retrieve or edit an object. There may also be a specific access rule relating to the same type of objects e.g., emails. Access rules may be related to specific search words comprised in the object or a manager may be authorized to retrieve all objects created or owned by members of his team Some examples of rules that may be applied are:
All objects in one directory may be accessed by all members of group A.
All objects comprising the string "volvo" may only be accessed by the project group "volvo" or by the management team.
Emails may only be accessed by the IT administrator.
Administrators may access all objects Rules may apply to individual users or to user groups. According to one aspect, the access rules correspond to different roles or users. User groups are typically based on organizational or geographical units within a company. Examples of user groups are management team, administrators, Malmö Office etc.

The rules may both be static and dynamic. Dynamic rules may change over time. Static rules typically define system administrators. Examples of static rules are:
1. Any request from Group A has the following list of authorizers of info administrators: admin1, admin2
2. Any request to group A has the following list of info administrators: admin1
3. Any request from Group A,B or C TO group D lets each object creator be info admin According to one aspect of the invention, the access rules are dynamic. Dynamic rules may typically be used for sensitive project or at specific time periods e.g., just before a financial statement. An enterprise may typically add or amend dynamic access rules using a user interface in the controller.

Examples of dynamic rules are:
1. Any document created during June 2013 containing "Project X" has these info administrators: admin1, admin2
2. Any email from user1@company1.com has these info administrators: admin1, admin3

According to one aspect, one object may be associated with several rules. Hence, note that several rules, having different priority may apply to one object. Then the rules having the highest priority overrule other rules.

According to one aspect of the invention, the data storage 10 comprises an index 60. The index 60 is a standard search index of the data storage 10. The index 60 is configured to include information about the objects in the archive for search engine indexing. Search engine indexing collects, parses, and stores data to facilitate fast and accurate information retrieval. Popular engines focus on the full-text indexing of online, natural language documents. The index 60 is updated every time the archive is updated. According to one aspect, the index comprises a link to the copies stored together with the information about the objects.

The rules and authorizer register 30 is a register comprising information about the rules applying to the objects in the data storage 10. According to one aspect, this register is integrated in the data storage. However, it may also be a separate register, comprising information about the rules and authorizers. The rules and authorizer(s) data storage 30 may be divided into two parts wherein e.g., one comprises information about the users and authorizers and the other comprises information about the rules that apply.

The data storage controller 20 is configured to execute the method of granting access to objects in a data storage comprising objects associated with different access rules. The controller is configured for handing access requests from users to the data storage. The users 40 communicate using a web interface 21. The data storage controller communicates with the rules and authorizer register, which comprises information about who is authorised to grant access to the objects in the data storage. The controller 20 also communicates with the respective authorizers 50, in order to request that access is granted to particular objects, when requested.

The data storage controller 20 is configured to receive a request to access one or several objects in the database from a requester; retrieve access rules of the requested object or objects; analyze the access rules to determine if requester is permitted to access the requested object or objects and if the request is not permitted to read at least one of the requested objects, then: sending a permission request(s) to an authorizer(s); receiving permission response(s) from the authorizer(s) and grant permission to the requested objects based on the access rules of the requested object and the received permissions.

FIG. 1 further discloses a user 40 and an authorizer 50. In a real implementation there is of course more than one user and often more than one authorizer. The authorizers may be users with special permissions.

Figure 2:
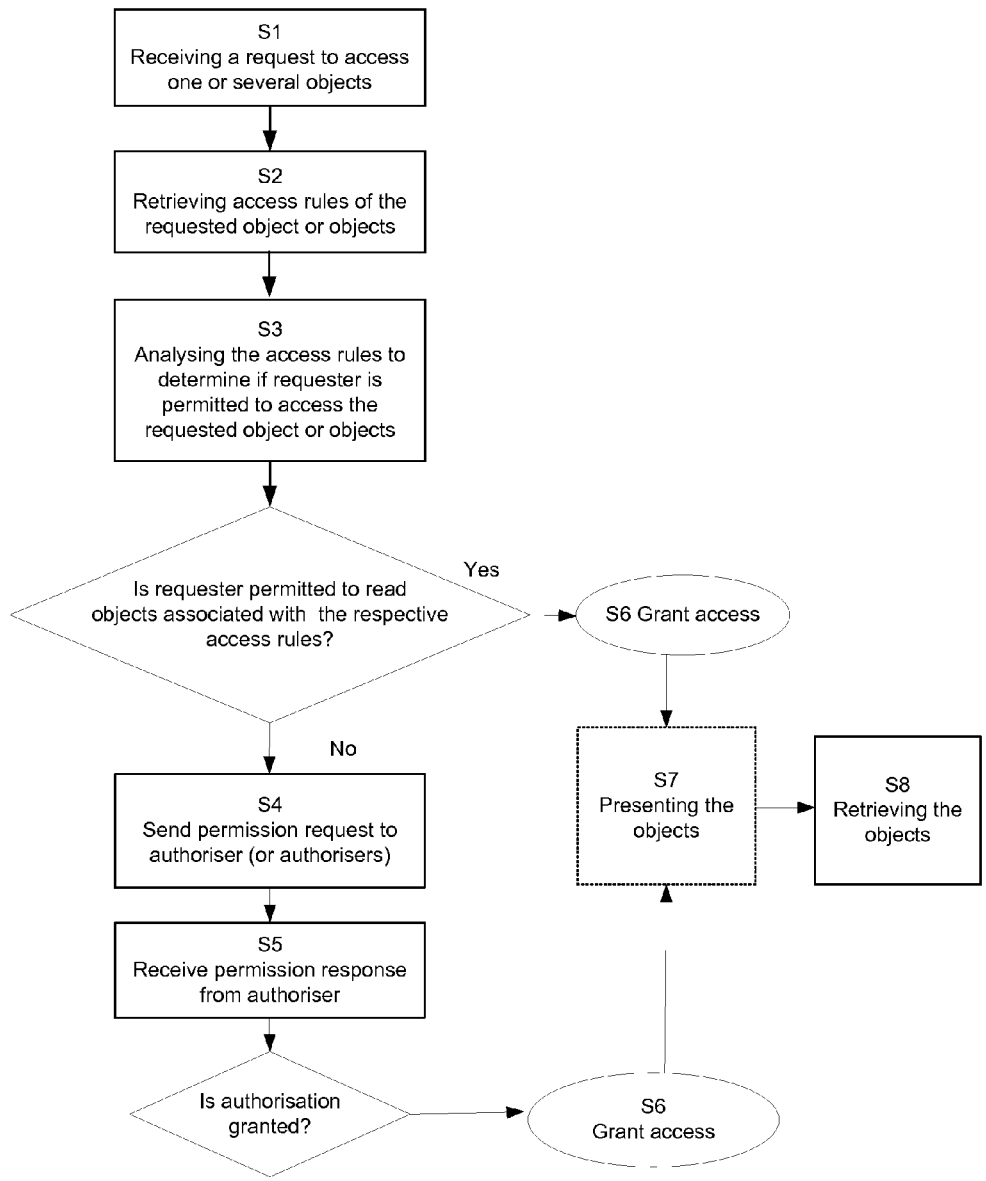
FIG. 2 is a flow chart illustrating of granting access to objects in a data storage comprising objects associated with different access rules.
Figure 3:
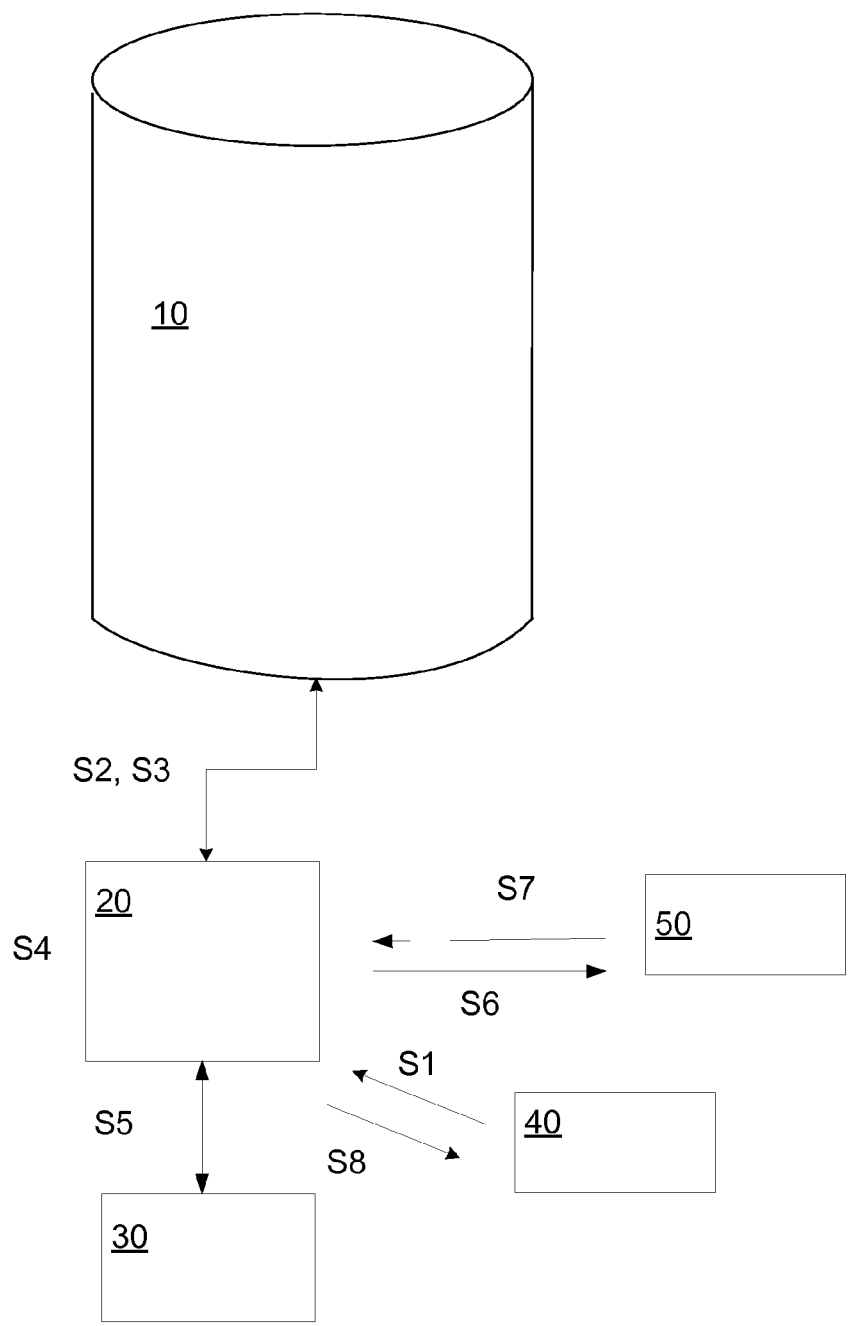
FIG. 3 illustrates the communication in the search system according to an exemplary embodiment of the present disclosure.

The method of granting access to objects in a data storage comprising objects associated with different access rules in the system of FIG. 1 will now be described referring to FIG. 2 and FIG. 3. FIG. 3 illustrates the communication in the search system.

According to one aspect, the data storage controller retrieves the requested object or objects, or at least part of them, from the data storage. This step is voluntary if decision on access may be made without retrieved the object, then the data may be retrieved first when access is granted.

The method is initiated by the controller receiving S1 a request to access one or several object from a requester. The requester is any person having access to the controller e.g., one of the users. The request is typically made via a web interface 21 of the data storage controller 20. The request may be directed to a particular object or it may be a general search. A general search may comprise key words. A filter search is also possible.

In response to the request, the controller 20 retrieves S2 access rules of the requested object or objects. If the request is a search the controller may first use the search index 60 to retrieve the requested files or at least information about them.

According to one aspect, the access rules are retrieved from the rules and authorizer register 30. The rules may be specified in the object, in the data storage controller or in a separate data storage. Rules are e.g., controlled by the owner of the object. There may also be dynamic rules e.g., all emails sent during time period must be authorized by admin 1.

In the next step, the controller 20 analyzes S3 the access rules to determine if the requester is permitted to access the requested object or objects. In this next step, the data storage controller checks for each retrieved object if the requesting user is authorized to access objects associated with the rules associated with the requested objects or objects.

According to one aspect of the invention, if the requesting user is authorized to access the object, the user is immediately granted access S3a to the object or objects. Access may be directed to reading, editing etc. depending on the case. Granted objects may be presented to the user in different ways. For example, the user may find a list of objects, each time he or she logs in. The objects may also be emailed to the user.

Sometimes only access to some of the retrieved objects is granted. Then only part of the requested objects i.e., the objects of the data storage matching the request are presented to the user.

If the requester is not permitted to read at least one of the requested objects, then the controller sends S4 a permission request to the authorizer. Information about an Information Administrator here referred to as authorizer, who can authorise access to the object or objects is e.g., part of the rules or may be retrieved from the rules and authorizer database. The authorizer index may be part of the data storage controller or of the data storage.

The request is e.g., by the controller automatically generating an electronic message to the authorizer. The electronic message is e.g., an email or an SMS. The contact information of the authorizer may be comprised in the rules and authorizer storage.

The authorizer may be a project leader or the manager for the person creating the rule. Sometimes there may be several dynamic rules. As an example, at a critical phase in a project, a specific access rule defining the project leader to be the only person who can authorise objects comprising a specific "search string". In this case the authorizer is user 1 who is the manager of user 2.

The controller receives S5 a permission response(s) from authorizer(s) in response to the request. The response may be given by the authorizer selecting a link in the request message, wherein access permissions may be granted.

Finally, the controller grants S6 access to requested objects based on rules and received permissions. The step of granting in principle implies that the requester can access the objects. The controller may then presents links to the objects or the objects themselves to the requester.

According to one aspect the method further comprises presenting S7 the object or objects to the requester. According to one aspect only objects to which access is granted are presented. Secret objects, to which the requester is denied access, are then invisible. According to one aspect, the requester is informed about the objects to which access is denied or at least about the number of objects to which access is denied. It would also be possible to indicate all revealed objects in a list, wherein e.g., links are only provided to the documents to which access is granted. The other documents may be marked as "denied" or pending.

The objects may be presented in several ways. According to one aspect, the method further comprises presenting at least one link to the objects. Another possibility is that a zip file presented to the requester a few days later, when the requester logs in. The requester may also be notified via email or other means.

According to one aspect the step of presenting S7 the objects comprises successively presenting objects the requester when access is granted. This aspect of the invention implies that the documents are presented to the requester as soon as access is granted. Hence, the requester may get access to some documents right after placing a search string. There may then be additional hits, which require authorization. When an authorizer has granted access to one or several documents, the access will immediately be presented, e.g., by an email or displayed at system login.

According to one aspect, the method further comprises retrieving S8 the object or objects, to which access is granted from the data storage. This implies that the original document is fetched from the data base and provided to the requester e.g., in a zip file as mentioned before. Objects may be fetched at different points in the process, depending on the implementation. If the objects themselves comprise information needed for the authorisation, then the objects may need to be fetched before the access is granted.

Hence, a search may be executed which gives 50 hits, whereof the user is only authorised to view 30. The first 30 hits will then be presented to the user. The user may be given an indication that there are more results. However, the results will not be presented to the user if the authorizer does not give access. The next time the user logs in access may have been granted to further documents. Then these documents may be successively presented to the user, as described above. As an alternative only the titles or subjects of documents where authorisation is missing will be presented at the first stage. The user may then be given information that authorisation is pending. A link or file may be presented to the user, when access is granted.

Figure 4:
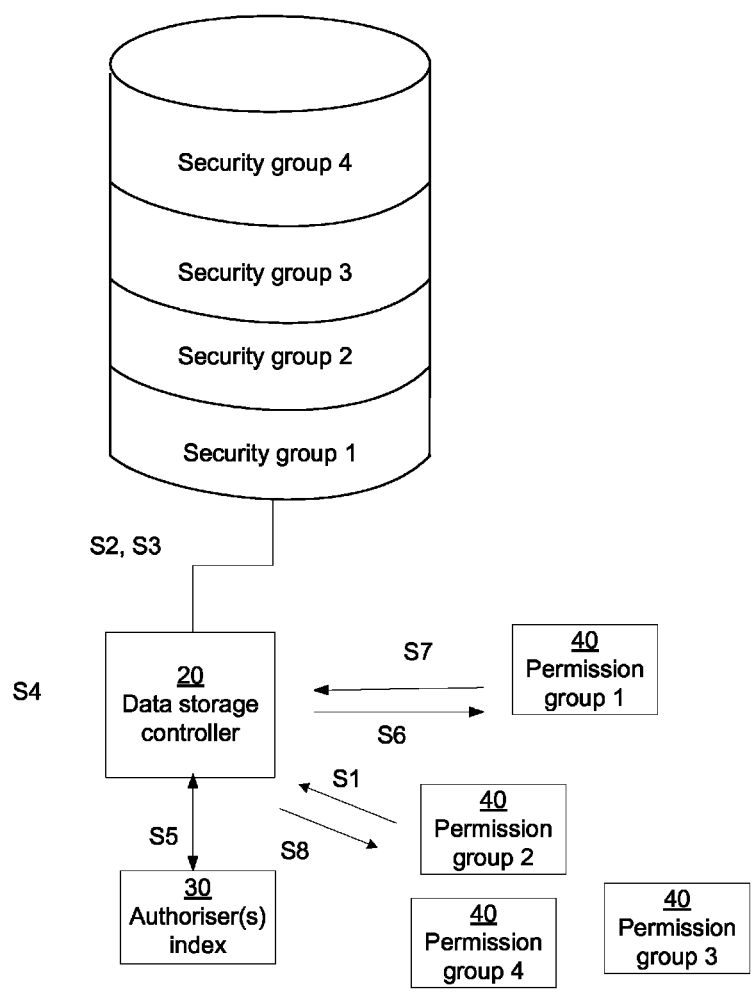
FIG. 4 illustrates the communication in the search system according to another exemplary embodiment of the present disclosure.

A particular embodiment of the invention is disclosed in FIG. 4. Here the objects are assigned different security levels corresponding to different access groups. When an object is retrieved, the data storage controller checks if the permission level of the user is higher than or equal to the access level of the object. If not, an authorizer will be identified and an authorisation request will be sent in the same way as described above. In such a situation an authorizer is typically a user with a higher permission level.

According to another aspect, the invention relates to a computer program, comprising computer readable code which, when run on a controller in, causes the controller to perform the method as described above.

The invention claimed is:

1. A method of granting access to objects in a data storage comprising objects associated with different access rules, the method comprising:
   receiving a request to access one or more sought objects from a requester, wherein the request comprises a search string defining the requested one or more sought objects;
   retrieving access rules of the requested object or objects defined by the search string;
   analyzing the access rules to determine if the requester is permitted to access the requested object or objects;
   if the requester is not permitted to read at least one of the requested objects, then:
      automatically sending a permission request, to authorize access to the at least one object that the requester is not permitted to read, to an authorizer; and
      receiving a permission response from the authorizer to read the at least one object;
   granting access to requested objects based on rules and received permissions; and
   successively presenting sought objects to the requester as access is granted for the sought objects.

2. The method according to claim 1 further comprising presenting the at least one sought object to which permission is granted to the requester.

3. The method according to claim 1 further comprising presenting at least one link to the objects.

4. The method according to claim 1, wherein the data storage is a cloud database.

5. The method according to claim 1, further comprising:
   retrieving the sought object or objects, to which access is granted from a database.

6. The method according to claim 1, wherein the access rules are dynamic.

7. The method claim 1, wherein the access rules correspond to different roles or users.

8. The method according to claim 1, wherein one object may be associated with several rules.

9. A non-transitory computer-readable medium comprising computer readable instructions which, when executed by a controller, cause the controller to:
   receive a request to access at least one sought object from a requester, wherein the request comprises a search string defining the requested at least one sought object;
   retrieve access rules associated with the requested at least one sought object defined by the search string;
   analyze the access rules to determine if the requester is permitted to access the requested at least one object;
   in response to determining that the requester is not permitted to read a first one of the at least one object:
      automatically send a permission request, to authorize access to the first object, to an authorizer, and
      receive a permission response from the authorizer to read the first object;
   grant access to requested objects based on the access rules and received permissions; and
   successively present sought objects to the requester as access is granted for the sought objects.

10. A searching system for granting access to objects, the searching system comprising:
    a data storage comprising objects associated with different access rules;
    a rules and authorizer data storage; and
    a data storage controller configured to:
       receive a request to access one or several objects in the data storage from a requester, wherein the request comprises a search string defining the requested one or several objects;
       retrieve access rules of the requested object or objects defined by the search string;
       analyze the access rules to determine if the requester is permitted to access the requested object or objects, and if the requester is not permitted to read at least one of the requested objects, then:
          automatically sending a permission request to authorize access to the at least one object that the requester is not permitted to read, to an authorizer;
          receiving a permission response from the authorizer to read the at least one object;
       grant access to the requested objects based on the access rules of the requested object and the received permissions; and
       successively present objects to the requester as access is granted for the respective objects.

11. The system of claim 10, wherein the access rules are dynamic.

12. The system of claim 10, wherein the access rules correspond to different roles or users.

13. The system of claim 10, wherein one object may be associated with several of the access rules.

* * * * *